United States Patent [19]

Wurst et al.

[11] Patent Number: 5,972,256
[45] Date of Patent: Oct. 26, 1999

[54] METHOD FOR DETERMINING DEFLECTION OF MOLD CORE-PIN

[75] Inventors: Richard Wurst; Brad H. Watkins, both of Traverse City, Mich.

[73] Assignee: RJG Technologies, Inc., Traverse City, Mich.

[21] Appl. No.: 09/207,452

[22] Filed: Dec. 8, 1998

Related U.S. Application Data

[60] Division of application No. 08/876,807, Jun. 16, 1997, Pat. No. 5,846,573, which is a continuation-in-part of application No. 08/353,180, Dec. 9, 1994, Pat. No. 5,639,487.

[51] Int. Cl.⁶ .................................................. B29C 45/77
[52] U.S. Cl. ...................... 264/40.1; 264/40.5; 425/149; 425/150; 425/468; 425/577
[58] Field of Search .................. 264/40.1, 40.5, 264/328.1, 334; 425/149, 150, 468, 575, 577, 588; 73/768; 364/188, 475.02, 475.05, 475.08, 475.09

[56] References Cited

U.S. PATENT DOCUMENTS

| | | | |
|---|---|---|---|
| 2,036,458 | 4/1936 | Carlson | 374/188 |
| 4,332,545 | 6/1982 | Cargile | 425/577 |
| 4,478,089 | 10/1984 | Aviles et al. | 73/862.04 |
| 4,526,044 | 7/1985 | Moser et al. | 73/768 |
| 4,730,497 | 3/1988 | Rabensteiner et al. | 73/768 |
| 5,377,548 | 1/1995 | Ballivy | 73/768 |
| 5,402,689 | 4/1995 | Grogan | 73/768 |
| 5,472,331 | 12/1995 | Watkins | 264/40.5 |
| 5,510,065 | 4/1996 | McFarlane | 264/40.5 |
| 5,639,487 | 6/1997 | Wurst et al. | 425/149 |
| 5,846,873 | 12/1998 | Wurst et al. | 425/149 |

*Primary Examiner*—Jill L. Heitbrink
*Attorney, Agent, or Firm*—James M. Deimen

[57] ABSTRACT

A transducer for measuring the amount of lateral deflection taking place at the tip of a core-pin inside a mold or die cavity. Non-uniform cavity pressure and cooling patterns make core-pins prone to deflection resulting in out-of-tolerance thin and thick wall sections of the finished part. The transducer provides a means of determining deflection as it occurs during the molding process for statistical quality control. Real time measurement of the core deflection allows discrimination of unacceptable and reject parts for an automatic part sorting process. In the preferred embodiment a plurality of strain gauges mounted on the core-pin outside of the mold cavity provide real time electric signals of lateral deflection that can be used to automatically segregate reject parts and provide for statistical process control. The electric signals are conditioned and manipulated with electronics and firmware to generate real time information corresponding to forces applied to the core-pin and deflections of the core-pin in response thereto. The information produced may be viewed graphically in real time and used to manually or automatically adjust molding parameters and reject out-of-spec products.

6 Claims, 3 Drawing Sheets

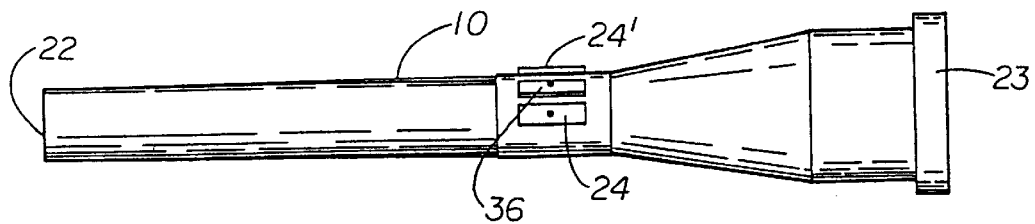
FIG 2
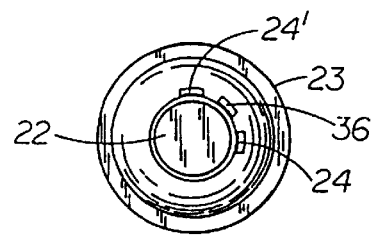
FIG 3
FIG 4
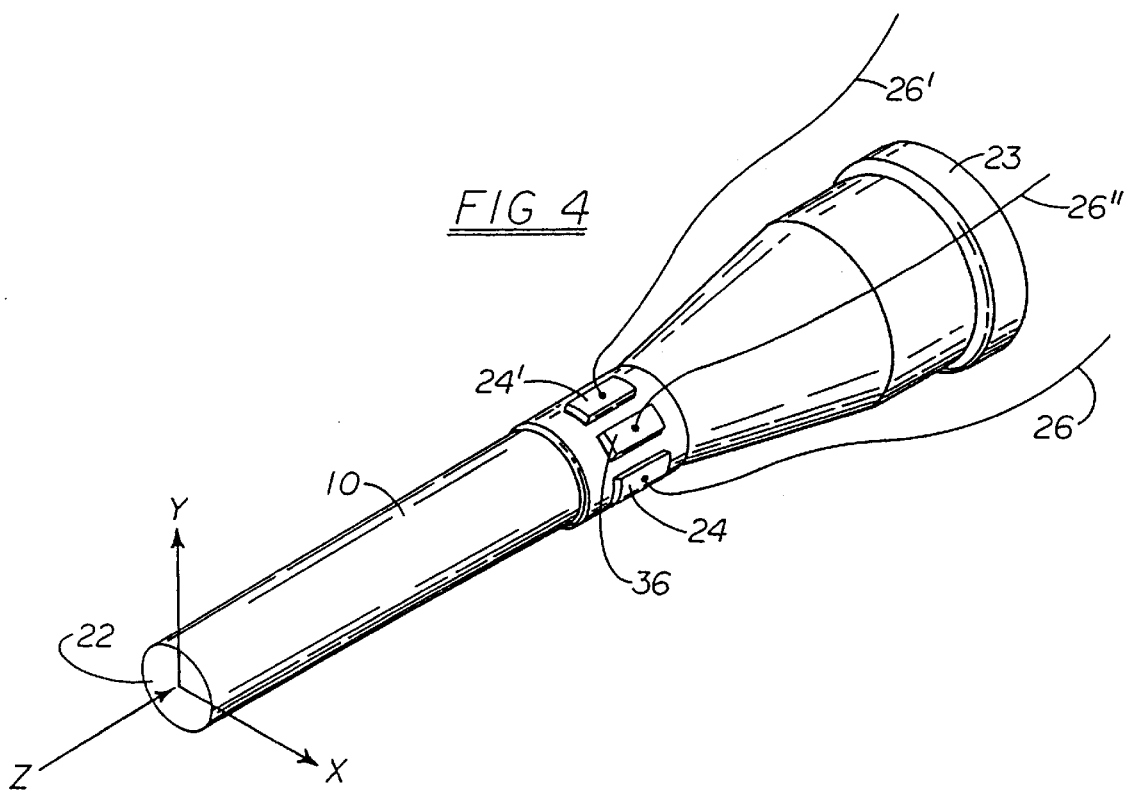

5,972,256

METHOD FOR DETERMINING DEFLECTION OF MOLD CORE-PIN

BACKGROUND OF THE INVENTION

This is a divisional of application Ser. No. 08/876,807 filed on Jun. 16, 1997, now U.S. Pat. No. 5,846,573 issued Dec. 8, 1998, in turn a continuation-in-part of application Ser. No. 08/353,180 filed on Dec. 9, 1994, now U.S. Pat. No. 5,639,487 issued Jun. 17, 1997.

The field of the invention pertains to the injection molding of hollow plastic articles and, in particular, to preforms for bottles, syringes and other long slender hollow articles having one end closed and the other end open. The hollow interior is typically shaped by a core-pin. In processing the injection molding of parts that utilize a core-pin, such as medical syringes or bottle preforms, the core-pin forms the inner diameter of the part, and ideally maintains the part inner diameter concentric with the outer diameter. Unfortunately, the effectiveness of this pin is influenced by non-uniform fill and pack pressure, and non-uniform cooling gradients across the part wall. The non-uniform pressures and cooling gradients cause the core-pin to deflect off center and upon hardening (cooling) of the part, dimensional requirements of the wall thickness are not met In modern injection molding machines formation and cooling of a part takes only a few seconds followed by opening of the mold and ejection of the part. Without real-time instrumentation sensing molding conditions, a molder does not have effective ways to measure, monitor and interpret the influences which the instantaneous plastic conditions have on the part directly resulting from the forces applied by the plastic to the core-pin of the mold.

SUMMARY OF THE INVENTION

This invention comprises transforming a mold's core-pin into a transducer to measure the quantified deflection occurring at the core-tip. Strain gauges are bonded to the core-pin to sense off-center displacement of the core-tip. Two such strain gauges are located on the core-pin, just outside the mold or die cavity itself, at locations where the strain due to bending can be sensed. The transducer is designed to respond to bending since the tip deflection is related to the bending moment on the core-pin. The use of the transducer allows sensing and monitoring of tip deflection as it occurs in correlation with the filling stage, packing stage, and holding stage of the molding process cycle.

Determination of the magnitude and direction of the tip deflection is accomplished by monitoring two channels of data from the transducer. The transducer has two strain gauge bridges oriented to measure bending in two perpendicular planes. The magnitude and direction of core-tip deflection can thus be determined by data reduction or by electronically combining the signals from these two channels. The magnitude and direction can be continuously monitored, recorded and used to automatically reject defective product. The two strain gauges are oriented such that loads in the axial direction of the core-pin cancel.

A third strain gauge is oriented on the core to sense only axial loads on the core-pin. (This instrumentation is described in co-pending application 08/250,914 assigned to RJG Technologies, now U.S. Pat. No. 5,472,331.) This strain gauge can provide valuable information about the plastic resin pressure in the mold cavity during the filling, packing, and holding stages of the molding process. Further, the signal from this strain gauge can be used for control to switch the molding machine from one stage to another, or for monitoring to assure a quality process. Also, during part ejection the force required to strip the part from the core-pin can be measured.

Using wheatstone bridges or similar devices wherein the strain gauges are part of the circuitry, calibrated output signals represent imposed axial (longitudinal) and lateral forces applied to the core-pin as the molten plastic comes into contact with the core-pin. The signals are conditioned and manipulated with electronics and firmware to generate information corresponding to representative events occuring in the molding process. The information may be displayed in graphic form with software running on a personal computer.

The injection molder can utilize the information presented in numerical or graphic form to make logical assessments about the process occuring in the mold and take corrective action through manual process control adjustments. The information derived from measurement of the forces on the core-pin allows detection and interpretation of the following specific processing conditions which impact finished part consistency and quality.

Mold problems are recognized if due to mechanical misalignment, temperature variations, strip-off force difficulties related to core-pin metal surface finish, or hot runner imbalance problems causing non-repeatability in the molding process.

Other beneficial improvement areas include tuning the process setup to optimize packing pressure in the mold cavity, to maximize cooling of the core-pin, to regulate appropriate discharge of the material out of the mold cavity, and to assure minimal core-pin deflection retention before the mold opens to thereby limit wall thickness non-concentricity of the finished part.

With the new technology the "core-pin can be seen in action" and the information can be used to automatically detect if a problem occurs and warn an operator accordingly, or adjust the molding machine's control parameters by accounting for the process instability, thus resurrecting the part quality, automatically.

BRIEF DESCRIPTION OF THE DRAWINGS

FIG. 2 is a side view of the core-pin deflection transducer;

FIG. 3 is an end view of the core-pin deflection transducer;

FIG. 4 is a perspective view illustrating the forces and deflections measured by the transducer;

DESCRIPTION OF THE PREFERRED EMBODIMENTS

Figure 1:
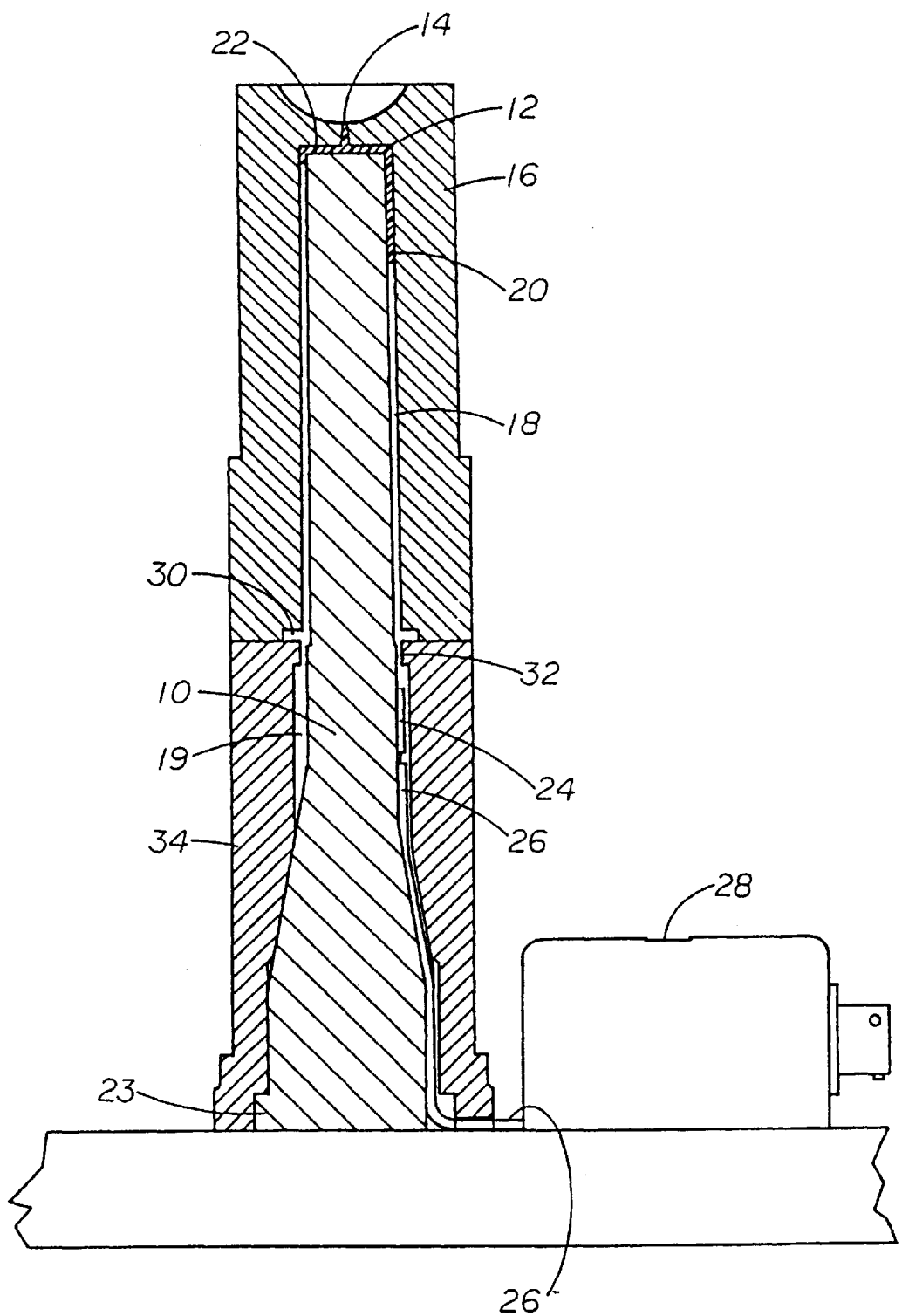
FIG. 1 is a partial cross section of the core-pin/cavity assembly in a mold.

As illustrated in FIG. 1 the core-pin tip deflection transducer 10 is shown installed in a mold 16. Molten plastic 12 is injected into the mold top cavity 18 at orifice 14 communicating with the top cavity. The plastic 12 flows over the core-pin 10 and fills the top cavity 18 to form the finished part. As the molten plastic flows over the core-pin 10 non-uniform pressure caused by uneven flow or non-uniform cooling may be applied in one side of the top cavity 18 resulting in non-uniform plastic flow about the core-pin 10 as illustrated at 20.

As a result of the non-uniform lateral pressure caused by the non-uniform plastic flow, a bending moment is applied to the core-pin 10 causing the core-tip 22 to deflect laterally relative to the core-pin base 23. Bending stresses in the core-pin 10 are sensed by means for detecting deflection such as the strain gauges 24 and 24' located on the core-pin 10 in cavity 19 beneath the top cavity 18.

The strain gauges form elements of Wheatstone bridges to ascertain deflection by means of electric signals. Other devices for detecting deflection can be employed, i.e., piezo-electric elements, electro-mechanical indicators or other solid state devices. For simplicity, only strain gauge 24 is shown in FIG. 1. Signals from the strain gauges 24 and 24' are conveyed by leadwires 26 extending from the strain gauges on the core-pin 10 to a junction box 28. The junction box 28 can enclose integral amplifiers or other signal conditioning for the strain gauge signals.

At the mold cavity end 30 opposite the orifice 14 there exists a small diametral clearance 32 between the core-pin 10 and the mold sleeve 34. The clearance 32 although small enough to prevent the molten plastic from entering the instrumented area in cavity 19, is large enough (about 0.001 inches) to allow significant deflection of the core-tip 22 before the core-pin 10 contacts the core sleeve 34.

In FIG. 2, FIG. 3 and FIG. 4, side, end and perspective views respectively of the core-tip 22 deflection transducer are shown. A third strain gauge 36 is located in cavity 19 with the strain gauges 24 and 24'. The third strain gauge 36 is oriented to sense axial loads on the core-pin 10. During the filling stage of the molding cycle, molten plastic enters the cavity and pushes axially on the core-tip 22. The strain gauges 24, 24' and 36 respond linearly to the applied force of the plastic entering the cavity. FIG. 4 shows the potential tip deflection of the core-tip 22 in the "X" and "Y" directions (perpendicular axial planes). Strain gauges 24 and 24' sense the core-tip 22 deflection in the "X" and "Y" directions and generate signals through channels 1 and 2 by means of leadwires 26 and 26' to the junction box 28 and therebeyond for conditioning and processing. Similarly, the generation of the signal through channel 3 corresponds to the axial compressive strain Z from the force of the plastic against the core-tip 22. This signal is also routed through a leadwire 26" to the junction box 28 for further conditioning.

Therefore, the plastic pressure in the cavity can be computed from the known applied force, and the projected area of the core-tip 22 (channel 3). The plastic pressure detected with strain gauge 36 represents the 'gate' or beginning of fill pressure in the mold cavity. For the purpose of controlling the molding process, gate pressure is the preferred measurement. This information can be used to accurately control the injection process if three stage molding is desired. The same strain gauge 36 can be used to determine the force required to remove the molded part from the core-pin 10 after the part cools and the mold opens.

The advantage of the use of the real time measurement of compressive strain with strain gauge 36 is that by controlling the molding process, the number of rejected parts is reduced. Thus, strain gauge 36 permits more accurate process timing. Strain gauges 24 and 24' permit more accurate measurement of core-pin 10 lateral deflection enabling more accurate set-up and modification of the mold and core-pin to bring the plastic products within specification, permit real time measurement and rejection of parts during production and signal mold failure when the rejection rate reaches a statistical predetermined limit. Expensive and time consuming post molding inspection can thereby be reduced or eliminated.

Figure 5:
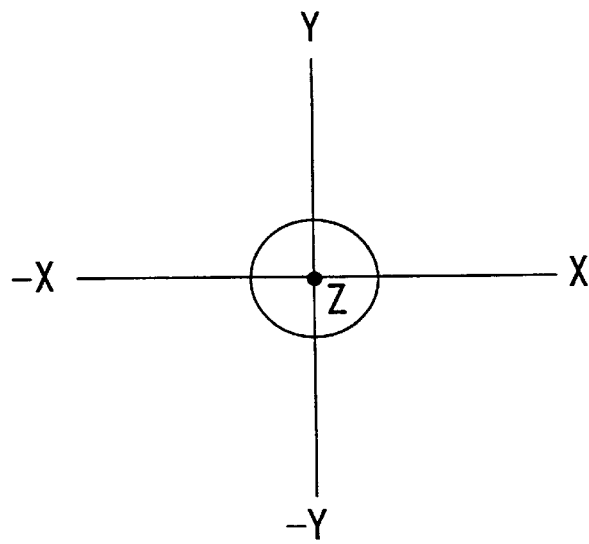
FIG. 5 is a graphical representation of an end view of the core-pin and deflection coordinates.

Each core-pin in an injection mold can potentially be applied with strain gauges as illustrated above to sense the three separate stress parameters. Stress on the core-pin is measured in the three perpendicular axes: "X", "Y" and "Z" and may be displayed as shown in FIG. 5. "Z" is the pressure axis measuring axial or longitudinal force on the core-pin. The "Z" force (measured by strain gauge 36 in FIG. 4) is used to register the amount of plastic pressure occuring in the mold cavity during filling, packing and cooling of the molten plastic to form the part. The "Z" force or pressure information is used to reveal mechanical mold problems, strip-off forces when the part is ejected from the core-pin, discharge of plastic out of the mold cavity before the plastic solidifies, and cooling of the plastic as it pulls away from the mold cavity and core-pin.

"Z" can be viewed on screen as a series of changing numbers or a curve along a time line or for a more permanent record as a profile curve in strip chart fashion. The curves or series of numbers can be generated with any generic strain gauge signal conditioning electronics and compatible data acquisition hardware and software.

"X" and "Y" are measurements of lateral or latitudinal movement of the core-pin (measured by strain gauges 24 and 24' in FIG. 4) and require special conditioning of the signal and data generated to provide useful information for the molder. The combination of the "X" and "Y" measurements of the lateral movement of the core-pin represents deflection magnitude and direction during the molding process. This deflection can produce finished part quality problems in the form of non-concentric wall thickness if undetected during the injection molding process. This non-uniform wall thickness is particularly troublesome to the plastic bottle industry where the defects do not appear until the secondary operation of blowing or stretch blowing the molded preform part into a bottle. The defects appear as paper thin or missing bottle sidewall portions. A poor alternative solution is to inspect each preform part against concentricity specifications after the part is injection molded but before secondary blow molding.

In the schematic view of FIG. 5 the coordinate "X" and "Y" plane is centered on the axis of the core-pin. Where the core-pin is not cylindrical a suitable center is selected based on the locations of the strain gauges 24 and 24' on the core-pin. The "X" and "Y" measurements can fall in positive or negative quadrants of the plane, such measurements being the raw information from which the lateral deflection of the core-pin can be determined. Knowing this direction of deflection during the molding process allows the molder to predict which particular sidewalls of the part will be thicker or thinner in thickness.

Figure 6:
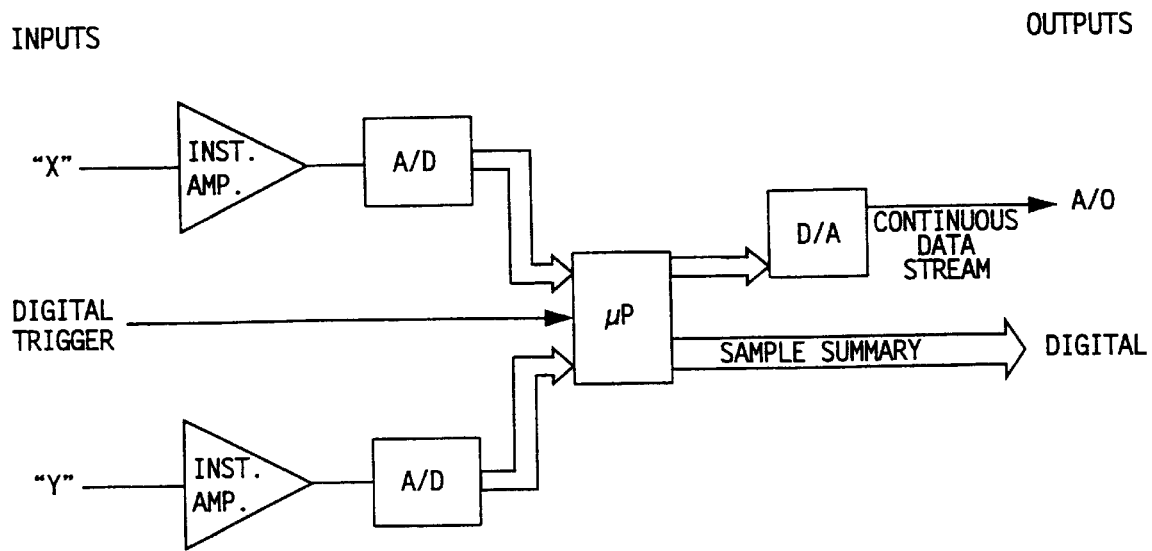
FIG. 6 is a schematic block diagram of the electronic deflection magnitude and angle measurement system.

As shown in the FIG. 6 block diagram an electronic circuit samples the "X" and "Y" channels to create a vector determination of the magnitude and polar behavior of the core-pin. The "X" and "Y" inputs are full strain gauge bridge signals which are conditioned by the instrumentation amplifiers shown. These amplified analog electric signals are respectively converted to digital data and sent to the microprocessor for computation. The microprocessor is programmed with standard trigonometric formulae to perform tangent calculations to determine polar angle and secant calculations to determine the magnitude of any core-pin deflection.

The angle and magnitude numbers may be converted back to analog signals for output to an accompanying data acquisition device such as a strip chart recorder or an on-screen rendition of FIG. 5 that may be displayed in real time or stored in memory for display at a slower pace.

Alternatively, in lieu of the analog output, the magnitude and angle can each be sampled during a specific time frame in the process, determined by a digital trigger input, in order to conserve on the amount of data collection. In this application, the microprocessor checks the inputs at a specific instant during the molding process and reports digital data for that instant of the molding process cycle. This sampling method can be used after a molder determines the instant in the molding process cycle where the measurement of core-pin deflection is particularly important and most strongly correlates to the finished part characteristics and imperfections.

Generally, the best sampling instant is just before the mold opens for part removal since this instant is when the cooled part takes on wall non-concentricities as a result of final core-pin deflection. Based on the sampling output alarm limits can be set as a part of the software in the microprocessor or on an accompanying digital data acquisition system to automatically warn the molder when parts are not meeting part specifications or to indicate a process adjustment must be made. The alarm limits may also be used to automatically eject out-of-spec parts as they move downstream after removal from the mold.

We claim:

1. A method for determining the deflection of a core-pin in a mold during the injection and cooling process cycle comprising, retrieving electric analog signals from a plurality of sensors mounted on the core-pin, amplifying and converting to digital form the electric signals, in a microprocessor applying a software program to calculate digital tangent and secant representations of the polar angle and magnitude of the core-pin deflection, and converting the digital tangent and secant representations to visual form.

2. The method of claim 1 including applying a software program to calculate plastic pressure occurring in the mold cavity in digital form and converting the plastic pressure in digital form to visual form.

3. The method of claim 1 including sampling the electric analog signal from the plurality of sensors at at least one discrete instant and displaying in visual form the digital tangent and secant representations for said at least one discrete instant only.

4. The method of claim 2 including sampling the electric analog signals from the plurality of sensors at at least one discrete instant and displaying in visual form the digital plastic pressure and the digital tangent and secant representations for said at least one discrete instant only.

5. The method of claim 1 including actuation of an alarm in response to exceeding a limit in the digital tangent and secant representations.

6. The method of claim 1 including actuation of an alarm in response to exceeding a limit in the digital plastic pressure.

* * * * *